United States Patent [19]

Schumacher et al.

[11] Patent Number: 5,359,837
[45] Date of Patent: Nov. 1, 1994

[54] HYDRAULIC ELEVATING MECHANISM FOR STRUCTURAL ASSEMBLIES ON AGRICULTURAL MACHINES

[76] Inventors: Gustav Schumacher, Gartenstrasse 8;
Guenter Schumacher,
Raiffeisenstrasse 10, both of, D 5231
Eichelhardt, Germany

[21] Appl. No.: 56,630

[22] Filed: May 3, 1993

[30] Foreign Application Priority Data

May 1, 1992 [DE] Germany ............... 4214265

[51] Int. Cl.5 ............... A01D 67/00; A01D 75/18
[52] U.S. Cl. ............... 56/10.4; 56/DIG. 10;
172/2
[58] Field of Search ............... 56/10.2 E, 10.2 F, 10.4,
56/DIG. 3, DIG. 11, DIG. 10; 172/2; 460/1, 6

[56] References Cited

U.S. PATENT DOCUMENTS

| | | | |
|---|---|---|---|
| 3,623,301 | 11/1971 | Hofer | 56/10.4 |
| 4,327,540 | 5/1982 | Swanson | 56/10.2 E X |
| 4,942,724 | 7/1990 | Diekhans et al. | 56/10.4 |

FOREIGN PATENT DOCUMENTS 3430125  2/1986  Germany .................. 56/DIG. 10

*Primary Examiner*—David J. Bagnell
*Attorney, Agent, or Firm*—Helfgott & Karas

[57] ABSTRACT

An hydraulic elevating mechanism for lifting and lowering an engineering structure which is sluingly supported around a rotational axis on a base unit, has two or more hydraulic lift cylinders pivoted to the base unit at one end and to the engineering structure to be slued at the other. The lift cylinders are controlled by hydraulic control circuits separated from each other and such that at least one of the lift cylinders is connected to a pressure reservoir.

6 Claims, 3 Drawing Sheets

HYDRAULIC ELEVATING MECHANISM FOR STRUCTURAL ASSEMBLIES ON AGRICULTURAL MACHINES

BACKGROUND OF THE INVENTION

The present invention relates to an hydraulic elevating mechanism for lifting and lowering an engineering structure sluingly supported around a rotational axis on a base unit and comprising two or more hydraulic lift cylinders pivoted to the base unit at one end and to the engineering structure to be slued at the other.

Elevating mechanisms of this sort are preferably employed in agricultural machines such as harvester threshers, mowers, potato and beet lifters and the like.

In the following, the invention is described in more detail based on a harvester thresher having a sluable cutter table as representing all such machines.

In the operation of a harvester thresher, the cutter table of this machine, in the majority of cases, has to be so guided over the ground that it will not dig into the soil but on the other hand will support its residual weight on the ground in order to follow the unevennesses of the ground and cut the wheat at a constant height.

In practice, unfortunately, difficulties are experienced in guiding the cutter table which is sluingly supported around a generally horizontal axis on the harvester thresher, over the ground in the way described in the foregoing. The major part of its weight is supported by one or a plurality of hydraulic cylinders which are pivotably supported at the cutter table on one hand and on the undercarriage on the other, rendering height adjustment of the cutter table possible. In order to be able to guide the cutter table with its residual weight so over the ground that it follows ground unevennesses without digging into it, spring elements of most different kind are employed. The most common practice is to provide a spring arrangement directly in the pressure medium which actuates the hydraulic cylinder. The spring arrangement consists of a gas volume of a predetermined amount introduced into the hydraulic system and is compressed by the hydraulic liquid under pressure. If the pressure in the hydraulic system decreases, for instance if he cutter table travels over a ground wave, the gas volume under pressure causes that, without actuating the lift valve, the major part of the cutter table weight is supported via the hydraulic cylinder(s) on the undercarriage and only a residual weight is supported on the ground.

The disadvantage of such an hydropneumatic pressure reservoir arranged in the hydraulic system is that this spring arrangement possesses a very steep spring characteristic, i.e. the hydraulic pressure significantly decreases already at a minute uplift of the cutter table so that the residual weight resting on the ground is substantially increased and the cutter table tends to dig into the ground.

In order to maintain the spring characteristic more flat, a pressure reservoir having a very large volume would have to be provided. This however has the disadvantage that the cutter table does not only spring upwards but also into the opposite direction, that is, locks downwardly if an additional load, for instance incoming straw, acts onto the cutter table. This is very much undesirable. Efforts are therefore directed towards permitting the cutter table to spring up with a very flat spring characteristic but to arrest it in the downward direction, if possible, in a non-lockable yet adjustable point.

In practice, it is for instance desirable to adjust the cutter table to a height of about 20 cm above ground whereby it does not lock in downwardly but on the other hand can spring upwardly without any great energy consumption.

In applicant's prior patent application, serial no. P 25 02 666.8, an hydraulic spring arrangement has been described which eliminates the disadvantages described in that a control cylinder is inserted between lift cylinders and pressure reservoir. This renders it possible to adjust the cushioning pressure and to lock he downward spring arrest of the cutter table, while spring-off upwardly is fully maintained.

A further method to cushion the cutter table weight consists in connecting one, or a plurality of mechanical springs to, or on, the lift cylinders which will then cushion the cutter table weight.

Although various different structures of this kind have been known, a completely satisfactory solution has hitherto not been found. The simplest way of mechanical cushioning consists in the provision of a helical spring between cutter table and lift cylinder. Such helical spring however has to be exactly adapted to the weight of the cutter table. It has to block as soon as the cutter table is lifted above the ground, i.e. to press together so far that one spring coil touches the next spring coil and the cutter table thus cannot lock downwardly. Upwardly, however, the spring force should be fully available. Since for the efficient work on the field, the light spring-off mentioned above is a pre-requisite, the spring characteristic has to be very flat. This leads to very large helical springs which have to be individually designed for each harvester thresher with respect to the different weights of the various cutter table types, which leads to a plurality of spring embodiments. This way of cushioning has the additional disadvantage that when travelling on a road, the spring effect cannot be eliminated, nor limited or reduced, which leads to major oscillations of the cutter table when travelling on uneven field paths.

Since the spring can be compressed only by the weight of the cutter table, it is further on not possible to make use of this kind of spring action in the case of harvester threshers provided with removable cutter tables. If the weight of the cutter table is lacking, the springs extend that far that the cutter table cannot be coupled in again.

In order to avoid these disadvantages, the springs are so arranged that the weight of the cutter table rests on the springs only if the cutter table is lowered. With one end, the spring rests against one outer support of the cylinder tube of the lift cylinder and with the other end on an outer support of the piston rod, where at least one of the outer supports is axially variable by means of a thread or a bracing clamp for the respective adjustment of the spring.

The disadvantage of this structure on one hand is that also in this case very large springs having a correspondingly flat spring characteristic have to be used in order to have available a desired large spring path of the cutter table and on the other hand that the spring adjustment for coupling the cutter table on and off has to be adjusted by hand to allow the conveyor channel of the harvester thresher to be lowered far enough for this coupling action while the weight of the cutter table is not available. This however requires too much of the time which is particularly scarce during harvest time.

During cutting action, the spring cannot be adjusted corresponding to the requirements; depending on the table height adjusted, the spring force therefore changes too much.

In order to obtain the required tensile path for this kind of cushioning, the piston rod, in its completely drawn-in state has to extend considerably out of the lift cylinder. This requires a substantially longer structure of the cylinder to make corresponding lift heights possible. This elongated structure however impairs the desired short pivot of the cutter tables so that constructional disadvantages have to be accepted.

In a further prior art embodiment of the cutter table cushioning by mechanical springs, the cutter table is not cushioned relative to the lift cylinder, the latter is rather so included into the cushioning that cutter table and lift cylinder are cushioned relative to the undercarriage. While this has the advantage that no breakaway forces have to be overcome in spring operation, the disadvantage is that the spring is constantly biased relative to the cutter table weight.

If the cutter table weight is varied by additional implements such as rope attachments, devices for sun flower harvesting or the like, the tension of the spring, too, has manually to be varied. In the majority of cases, this is done by cocking screws which, however, with a view to the required large spring force, are under an enormous tension, and substantial consumption of energy and time is required to adjust such cocking screws. It is obvious that such adjustment cannot be performed during the operation of the machine.

In one embodiment of applicant's prior patent application No. P 24 18 232.9, a pneumatic spring implement is described where the hydraulic lift cylinder is cushioned relative to the undercarriage by means of a pneumatic diaphragm cylinder. The diameter of the diaphragm cylinder in that case is substantially larger than the diameter of the lift cylinder and can, therefore, contrary to direct cushioning of the hydraulic medium by pneumatic pressure reservoirs, be operated with lower pressure. This low pressure has the advantage that atmospheric air can be used as pressure medium and the pressure in the pressure reservoir can be varied by means of conventional compressors as are commonly used in trucks, gas stations and workshops.

Since however harvester threshers and other working machines do not, as a rule, include compressor plants, the shock-absorber pressure once determined cannot be changed during operation. But even if a compressor were available, a rapidly desired increase of the shock-absorbing pressure takes too long since the pressure in the complete reservoir volume has to be increased.

In applicant's prior patent application No. P 27 28 199, a lift unit has been described, where the relief spring is also provided between undercarriage and cylinder unit. The cylinder unit consists of the proper lift cylinder and a cocking cylinder provided around the lift cylinder, where the lift cylinder, so to say, serves as cock cylinder. The bias of the spring can therefore be adjusted by means of corresponding control elements. The weight of the cutter table is supported via the lift cylinder, the cock cylinder and the spring on the undercarriage. The spring-off of the cutter table is made possible in that the cylinder unit can axially move at a predetermined amount within a bearing block provided on the undercarriage. This axial path however has to be restricted, otherwise the cutter table will oscillate very strongly, for instance when travelling on an uneven field path.

In combination with applicant's prior patent application No. P 25 29 160.5 wherein a circuit has been described wherein the length variation of a spring triggers corresponding switching functions to feed to, or drain, pressure medium from the lift cylinder, the spring path allowing only small spring force variation can be designed very extensive. The disadvantage of this unit however is that a complex guidance of the lift cylinder unit on the undercarriage is necessary which has also correspondingly to be maintained with grease.

The greatest disadvantage however, as mentioned above, is that the cutter table when travelling on the road can oscillate about an amount, and above all includes a lift retardation, which can correspond to the predetermined axial spring path of the lift unit if the cutter table touches the ground. This is of a particular disadvantage if, because of a sudden obstacle, the operator has to lift the cutter table very suddenly, the latter however will react only when the lift unit has performed the predetermined axial path mentioned above.

In applicant's prior patent application No. P 41 26 515.7, an elevating device has been described which is characterized in that a mechanical spring element having one or a plurality of cocking cylinders bridging the normal lift cylinder is so arranged that the bias force of the mechanical spring can be varied by means of the cocking cylinders.

While this structure, in combination with a corresponding electro-hydraulic control, responds to the requirements of a functioning cutter table system, it is relatively complex and hence cost-intensive. A further disadvantage is the voluminous structure of these elevating mechanism which alone accounts for the structural disadvantages.

The present invention now aims at providing a cost and space saving elevating-spring-mechanism for the cutter table which, in addition, fulfills all functional requirements.

This problem is solved by means of an hydraulic elevating mechanism of the kind defined in the beginning which is characterized in that the lift cylinders are controlled by hydraulic control circuits separated from each other and that at least one of these lift cylinders is connected to a pressure reservoir. The structure according to the invention therefore comprises separately provided hydraulic lift and spring cylinders having separate hydraulic control circuits each, whereby the hydraulic medium is cushioned in one or a plurality of lift cylinders by pressure reservoirs and is not, or only insignificantly, cushioned by means of one or a plurality of similarly pivoted and, if possible, constructionally identical hydraulic cylinders. For the spring action in the case of such a combined structure, a very large volume pressure reservoir can be used which therefore has a very flat spring characteristic and renders correspondingly long spring paths of the employed hydraulic cylinders possible while no pressure medium is supplied or drained.

By means of these hydraulically cushioned cylinders, the cutter table is guided in soil contact and hence with the supporting residual weight above the ground and is adjusted relative to the harvester thresher by the lift cylinder(s) not cushioned or only insignificantly cushioned, if mowing without ground contact is to be performed. Hydraulic control is performed in the cushioned hydraulic cylinders by the changing pressure in the hydraulic medium. This pressure, again, can be varied by corresponding control elements, as described further on, in response to the desired ground contact pressure. If mowing is to be performed above ground, that is not in soil contact, the lift cylinder(s) not hydraulically cushioned arel employed for controlling the cutter table. While, in this way, the cutter table can deviate upwardly via the hydraulically cushioned lift cylinders, a downward stroke is locked.

Since when lifting the table the cushioned cylinders support the lift cylinders, it has shown to be sufficient in most of the cutter tables presently employed to install two cushioned cylinders and one lift cylinder. It is of course possible to also employ a plurality of cushioned cylinders and a plurality of non-cushioned lift cylinders. The weight of the respective cutter table is decisive for the number and arrangement of the different cylinders respectively required.

In the following explanation based on a drawing of an embodiment according to the invention, an elevating mechanism comprising two lift cylinders hydraulically cushioned and one lift cylinder not cushioned or only insignificantly cushioned is described.

DETAILED DESCRIPTION OF THE PREFERRED EMBODIMENT

Figure 1:
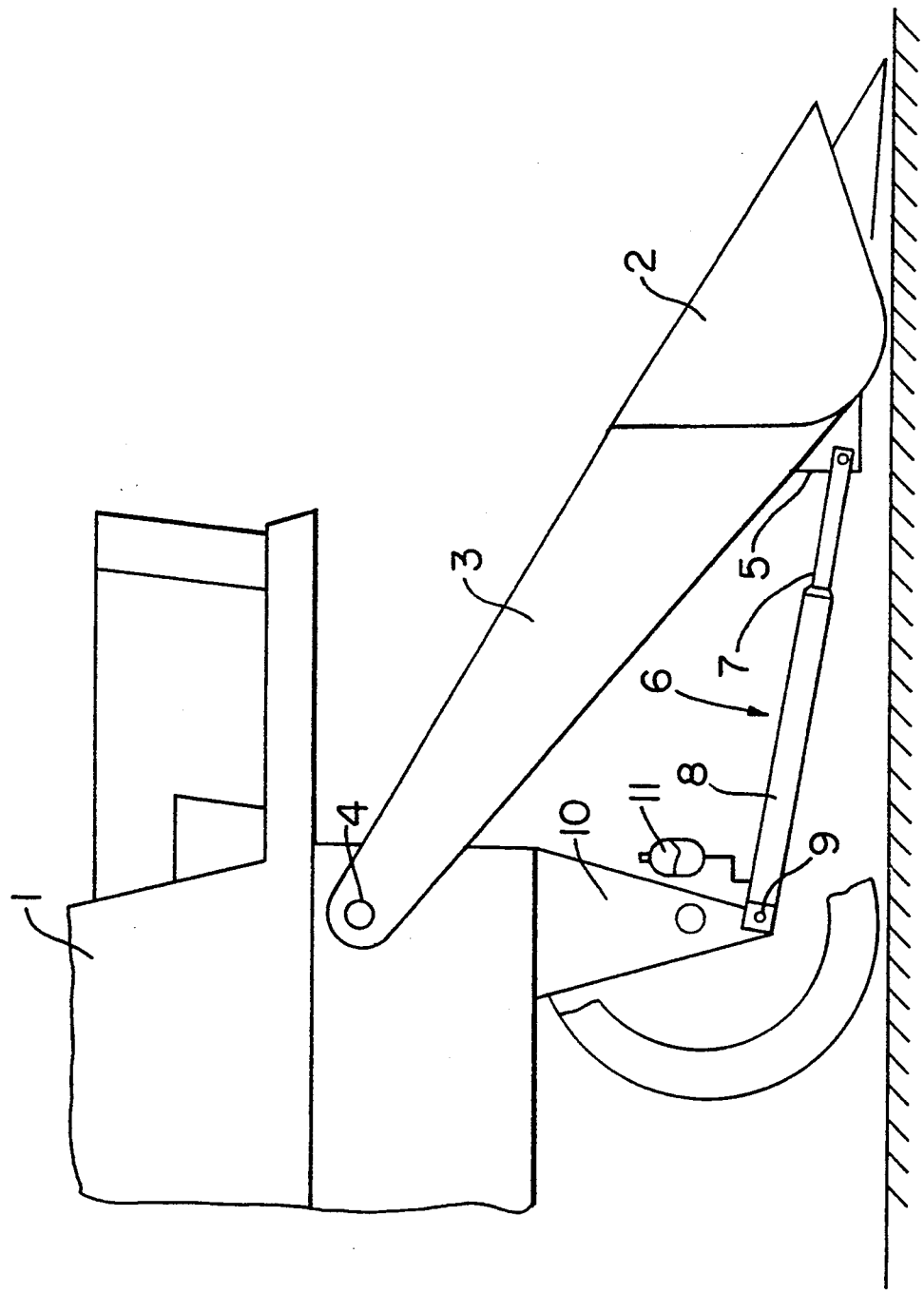
FIG. 1 is the schematic lateral view of a harvester thresher including a sluingly supported cutter table and hydraulic lift cylinder.

According to FIG. 1, cutter table 2 is sluingly supported, at 4, via conveyor channel 3, on base unit 1 of a harvester thresher. At transition position 5 between cutter table and conveyor channel, elevating mechanism 6 is hinged by piston rod 7, and lift cylinder 8 is secured, at 9, to undercarriage 10.

If mowing is to be performed at very short heights, for instance in case of wheat for storage, cutter table 2 should rest on the ground, with a residual weight only, though, since in case of too heave weight, the cutter table will cut into the ground or shift the earth in front of it. Such residual weight therefore has to be very small and has to be correspondingly cushioned.

In accordance with the invention, cushioning of the pressure medium is performed in cylinders 8 or by one or a plurality of pressure reservoirs 11 arranged one after the other.

Figure 2:
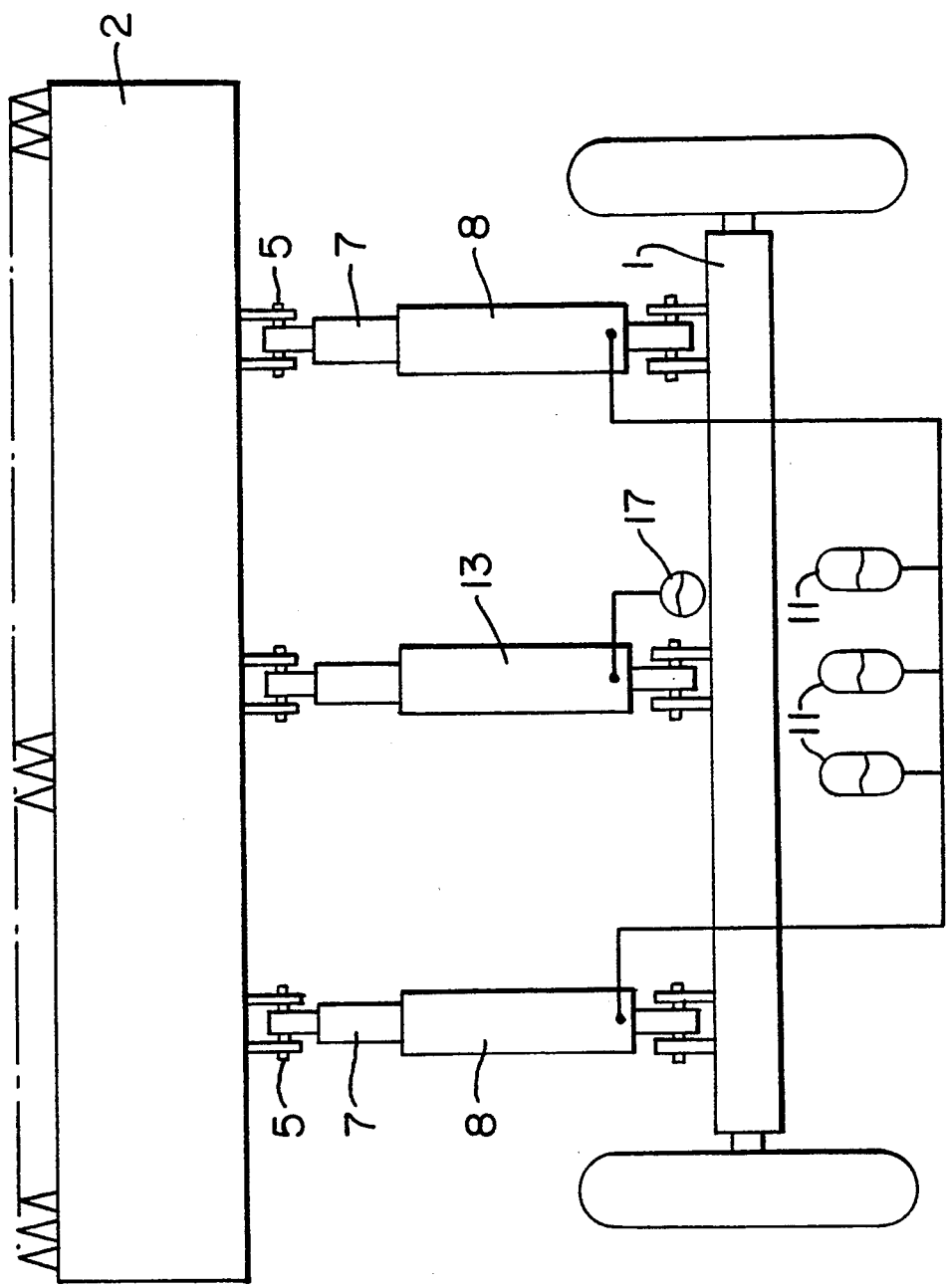
FIG. 2 is the top view of a combination according to the invention of two cushioned cylinders and one lift cylinder overpressure-cushioned only.

In accordance with FIG. 2, the two hydraulically cushioned cylinders 8,8 are pivoted, at 9,9, to undercarriage 10, and the piston rods 7,7 thereof, at 5,5, to cutter table 2. The pressure medium of these two cylinders is cushioned, by a large volume, by one or a plurality of pressure reservoirs 11. (With a view to the pressure medium regulation, it may be more favorable to install a plurality of smaller pressure reservoirs, coupled to the hydraulic side, rather than one large-volume reservoir).

The third lift cylinder 13 is not connected into the same hydraulic control circuit as are the two cylinders 8,8; it has an independent control circuit. The pressure medium of this lift cylinder, too, may (but need not necessarily) be cushioned by a pressure reservoir 17.

This pressure reservoir 17, as will be described later on, has only a safety function and is therefore much higher biased on the gas side than reservoirs 11 provided for control. For this cylinder furthermore on reservoir having a very small reservoir volume is sufficient.

Figure 3:
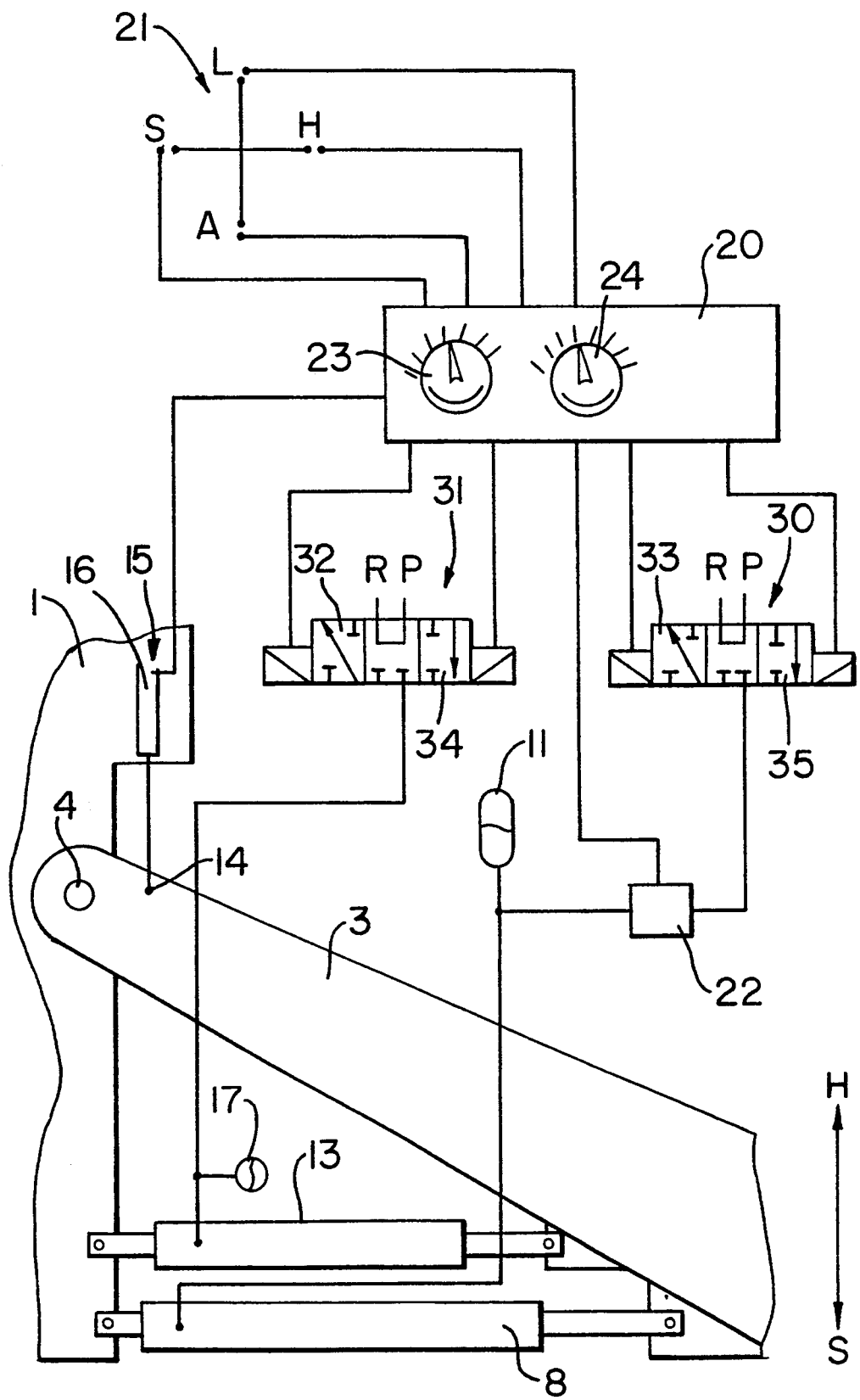
FIG. 3 is an electro-hydraulic function diagram.

FIG. 3 shows the hydraulic control according to the invention. For a better understanding, lift cylinder 13 is shown above control cylinder 8. The electrical circuit is not completely shown since the control of the hydraulic valves is possible by a plurality of various procedures available by modern electronic means. The electrical circuit is therefore restricted to the switching leads. Electronic connection is obtained by means of electronic evaluation device 20, on which the manually actuated control elements provided with corresponding dials, for the desired ground contact pressure and the desired height position of the cutter table relative to the undercarriage, are shown. It is obvious that these control elements may, user-friendly, be provided at a different location and connected by leads to the electronic evaluation device.

Main control switch 21 shows the switch positions A for Automatic, L for Position, H for Lift and S for Descend. The pressure in hydraulic cylinders 8 is transmitted via pressure measuring device 22 to the electronic evaluation device.

Conveyor channel 3 sluingly supported, at 4, to base unit 1, has an electronic motion pickup 16 pivoted, at 14, thereto which is pivoted, at the other end to base unit 1. This motion pickup calculates the relative position of conveyor channel 3 relative to base unit 1 and also passes the result to the electronic evaluation device.

By means of control element 23 the desired position of the table is adjusted, by means of control element 24 the desired ground contact pressure is adjusted. The control elements include, as already mentioned, scale graduations showing the values set at a given time.

Hydraulic three-position valve 30 is provided for hydraulic cylinder 8 cushioned via pressure reservoir(s) 11, three-position valve 31 is provided for lift cylinder 13.

If main control switch 21 switches the command Automatic, which means that the cutter table is to descend and to rest with a residual weight on the ground, valve 31 is switched by the electronic device into circuit diagram 32. Pressure medium from cylinder 13 is drained and the pressure in cylinders 8 increases since the support by cylinder 13 is lacking. The higher pressure is reported, via pressure receiver 22, to the electronic device and the latter switches valve 30 into diagram 33. Now pressure means is also drained from cylinders 8 and the table descends down to the ground. As soon as the table with a residual weight is on the ground, the pressure in cylinders 8 decreases and the electronic device switches valve 30 again into Neutral position. The desired contact pressure is predetermined on control element 24.

Cushioned by hydraulic reservoirs 11, the cutter table, with the residual weight determined by the preselected pressure in hydraulic cylinders 8, follows the ground unevennesses. At the same time, the piston rod of cylinder 13 moves to and from in response to the spring action since, on command Automatic, valve 31 is permanently switched in position 32. Pressure reservoir 17 is out of function since there is no pressure in cylinder 13 and pressure reservoir 17 is very heavily biased.

If the reservoir volume of pressure reservoirs 11 is not sufficient in order to respond to a larger ground wave which presses the cutter table upward, the residual weight of the table on the ground increases and the pressure in cylinders 8 decreases. Via pressure receiver 22 and the electronic device, valve 30 is switched to diagram 35 and pressure medium is supplied to cylinders 8 and hence also to reservoir 11. The pressure increases again.

If the cutter table travels over a ditch, that is the residual weight loses its ground contact, the pressure in cylinders 8 increases and valve 30 is now switched into diagram 33. Pressure means is drained from cylinders 8, the table descends into the ditch until the desired residual weight selected on control element 24 rests on the ground again.

If now command Position is switched on, for instance because mowing is no longer to be performed in soil contact but rather at a determined height above ground, motion pickup 16 is activated.

Via the electronic device, diagram 34 of valve 31 is now switched on and cylinder 13 receives pressure medium until the height, as adjusted on scale 23, of the cutter table relative to the undercarriage is reached. Then valve 31 switches into Neutral. With a view to the auxiliary action of lift cylinder 13, the pressure in cylinders 8 has decreased, too. Since on command Position, pressure control remains activated, too, the pressure in cylinder 8 predetermined on scale 24 is reestablished in that valve 30 switches into diagram 35. Now, the residual weight predetermined by the pressure control does no longer rest on the ground but rather on cylinder 13. The pressure in this cylinder in not, in this case, very high so that pressure reservoir 17 in view of its higher bias does not receive hydraulic pressure medium on the gas side. The cutter table cannot any longer lock downwardly because valve 31 after reaching the desired position is switched into Neutral.

If the table is to be lifted completely, the command Lift is switched at control switch 21. At this command, the position control, that is motion pickup 16 and position element 23 are not activated. On valve 31, diagram 34 is switched on. Lift cylinder 13 receives pressure medium until the desired height of the table is reached. Since in that switching position, the pressure-independent control for cylinders 8 also remains activated, cylinders S are also supplied with pressure medium.

In the elevated state, therefore, the table rests both on cylinders 8 and on cylinder 13.

When travelling on bumpy field paths, weight oscillations of the table come up. In order to cushion them, pressure reservoir 17 is provided since, were it not provided, the oscillation shocks would have to be absorbed by the pressure medium of lift cylinder 13 inelastic in the elevated state. Without cushioning by reservoir 17, this would lead to damages at the undercarriage, the cutter table and in the hydraulic circuit.

When directly switching from the elevated state of the cutter table to the command Position, valve 31 is switched into diagram 32. Pressure medium is drained from cylinder 13, and since this causes the pressure in cylinders 8 to increase, valve 30 also switches into diagram 33. The table descends again and when the adjusted position value is reached, valve 31 switches into Neutral again.

For fixing and removing the cutter table, the conveyor channel has do be lowered completely down without the weight of the table. For this case, the command Descend has been provided. If Descend is switched, the pressure control by pressure receiver 22 is overtravelled by the electronic device. Both valves 30 and 31 switch into descend position.

We claim:

1. Hydraulic elevating mechanism for lifting and lowering an engineering structure sluingly supported around a rotational axis on a base unit and comprising at least three hydraulic lift cylinders pivoted to the base unit at one end and to the engineering structure to be slued at another end, said hydraulic lift cylinders being controlled by hydraulic control circuits separated from each other, at least one of said lift cylinders being connected to a pressure reservoir, wherein two of said hydraulic lift cylinder controlled by a first hydraulic control circuit and hydraulically connected with one another by an hydraulic duct and a third hydraulic lift cylinder is controlled by a second hydraulic control circuit.

2. Hydraulic elevating mechanism according to claim 1, wherein said two hydraulic cylinders assigned to said first hydraulic control circuit and hydraulically connected to each other are connected to at least one hydraulic pressure reservoir and said third lift cylinder controlled by said second hydraulic control circuit is connected to a separate hydraulic pressure reservoir which has a smaller volume and on a gas side thereof is biased at a higher amount than said of least one hydraulic pressure reservoir assigned to said first hydraulic control circuit.

3. Hydraulic elevating mechanism according to claim 1, wherein said first hydraulic control circuit is provided with large-volume pressure reservoirs a pressure receiver is provided which reports hydraulic pressure currently in said hydraulic lift cylinders to an electronic evaluation device coupled to said pressure receiver.

4. Hydraulic elevating mechanism according to claim 3, wherein said electronic evaluation device includes a control element and the pressure, predetermined by said electronic evaluation device, in said hydraulic lift cylinders connected to said first hydraulic control circuit can be varied by said control element.

5. Hydraulic elevating mechanism according to claim 3, wherein said engineering structure further comprises a cutter table and a conveyor channel, the elevating mechanism further comprising a motion pickup which, at a suitable measuring position reports values of a height position of said cutter table relative to said base unit and an angular position of said conveyor channel relative to said base unit, to said electronic evaluation device.

6. Hydraulic elevating mechanism according to claim 6, wherein said electronic evaluation device includes a control element for varying a value reported from said motion pickup to said electronic evaluation device.

* * * * *